HEARING AID AUTOMATIC GAIN CONTROL SYSTEM

Filed May 28, 1962 2 Sheets-Sheet 1

INVENTOR.
Kenneth R. Wruk
BY James E. Tracy
Atty.

INVENTOR.
Kenneth R. Wruk
By James E. Tracy
Atty.

United States Patent Office 3,244,997

Patented Apr. 5, 1966

3,244,997

HEARING AID AUTOMATIC GAIN CONTROL SYSTEM

Kenneth R. Wruk, Joliet, Ill., assignor to Zenith Radio Corporation, Chicago, Ill., a corporation of Delaware Filed May 28, 1962, Ser. No. 198,129
3 Claims. (Cl. 330—26)

Figure 1:
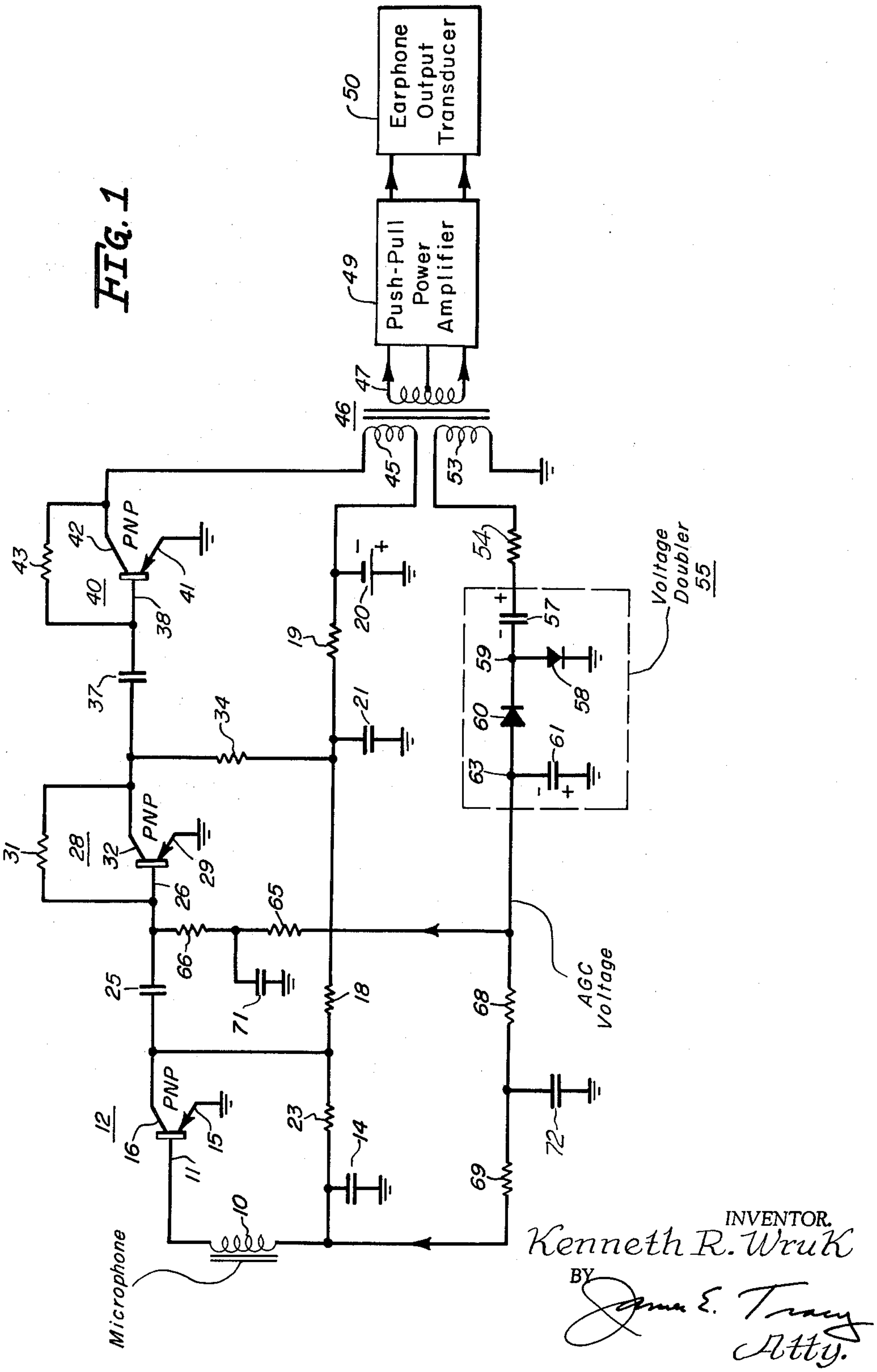

This invention relates in general to hearing aids and more particularly to an automatic gain control arrangement for miniaturized hearing aids.

The desirability of incorporating automatic gain control (sometimes referred to herein merely as AGC for convenience) in a hearing aid amplifier has long been appreciated. In the absence of such control, a hearing aid amplifier is usually designed to achieve the greatest amplification of which it is capable, and this amplification prevails for incoming received acoustic energy of any loudness magnitude. As a consequence, for audio sounds of relatively large amplitude, the hearing aid amplifier without AGC is overdriven, resulting in clipping of both the positive and negative peaks of the amplified audio signal. Of course, the distortion introduced by such clipping is manifest in the output of the hearing aid output transducer, be it an earphone or a bone conduction receiver, as annoying "banging" sounds which seriously decrease the intelligibility.

Overdriving of hearing aid amplifying systems in response to relatively high-intensity sounds has been avoided in the past by the expedient of AGC circuits. Unfortunately, previously developed automatic gain control circuits have introduced significant distortion to the amplified audio signal such that a marked lack of fidelity, and in fact sometimes complete loss of intelligence information, ensues in the hearing aid output. This distortion and loss of information is attributable to the attack and recovery times of prior AGC circuits.

To explain, during the reception of low level sounds by the hearing aid microphone, the AGC circuit usually conditions the amplifying stages to realize the greatest gain of which they are capable. If there is then a sudden increase in loudness of the received acoustic energy the AGC arrangement responds thereto and decreases the gain of the amplifying system. If the attack time, namely the time duration required for the gain of the amplifying system to decrease, is made too short or fast the AGC voltage changes so abruptly that a transient having frequency components falling in the audible range is introduced which manifests itself in the output signal of the amplifying system as a noticeable "pop." On the other hand, it is desirable that the attack time not exceed a predetermined time limit, since otherwise the increased loudness of the incoming sound causes overdrive in the amplifying system between cut off and saturation resulting in a loud and discomforting "banging." Hence, it is desirable that the attack time be arranged to fall within predetermined limits. This may be achieved by employing a resistive-capacitive network, having an appropriate time constant, for controlling the attack time.

In response to decreased loudness of an incoming acoustic signal, it is necessary that the AGC system condition the amplifying system to effect increased gain. Again, it is desirable that the time required for increasing the gain, called the recovery time, be held within predetermined limits. If the recovery time is too fast, a transient may be developed in the AGC voltage which is reflected in the amplified audio signal as audible distortion. In other words, the transient may contain frequency components in the audible range which would be amplified in the hearing aid amplifying circuit. Addtionally, if the recovery time is too fast, "plosives" may develop, namely ringing sounds develop that effectively add "edges" to words.

If the recovery time is too slow or long, "blackouts" in the amplified audio signal manifest. Specifically, an increase in gain would be delayed such that portions of the incoming acoustic energy would not be amplified sufficiently and thus would be completely lost. Again, the establishment of an appropriate recovery time may be realized by a resistive-capacitive network in the AGC system exhibiting a selected time constant.

Usually, it is desirable that the attack time be made shorter than the recovery time and thus different resistive-capacitive networks must be employed to achieve the required different time constants. In current hearing aid amplifying systems which are fully transistorized and confined within a very small space, such as within a pair of spectacle frames, the employment of two independent resistive-capacitive networks requires a significant increase in the space required by the hearing aid circuit, and increases the cost as well.

In accordance with one of the aspects of the present invention, an AGC arrangement is provided which features different attack and recovery time constants and yet this is achieved by a pair of resistive-capacitive networks having at least a plurality of components which are common to both networks.

Accordingly, it is an object of the present invention to provide a new and improved hearing aid apparatus.

It is a particular object of the invention to provide a novel automatic gain control arrangement for a hearing aid circuit.

In accordance with another aspect of the invention, precise ranges for optimum attack and recovery times have been discovered.

A hearing aid, constructed in accordance with one aspect of the present invention, comprises an amplifying system for developing, in response to received acoustic energy of varying loudness, an amplified audio signal representative of the acoustic energy. There are means coupled to the output of the amplifying system for developing from the amplified audio signal an automatic gain control voltage having a magnitude determined by the loudness of the incoming received acoustic energy. There are other means for utilizing the automatic gain control voltage for regulating the gain of the amplifying system. A first resistive-capacitive network is included in the voltage developing means, and this network includes a plurality of resistive and capacitive components for establishing an attack time of predetermined duration. There is a second resistive-capacitive network included in the voltage developing means, and including a plurality of the resistive and capacitive components comprising the first resistive-capacitive network, for establishing a recovery time of a certain duration, greater than the duration of the attack time.

Figure 2:
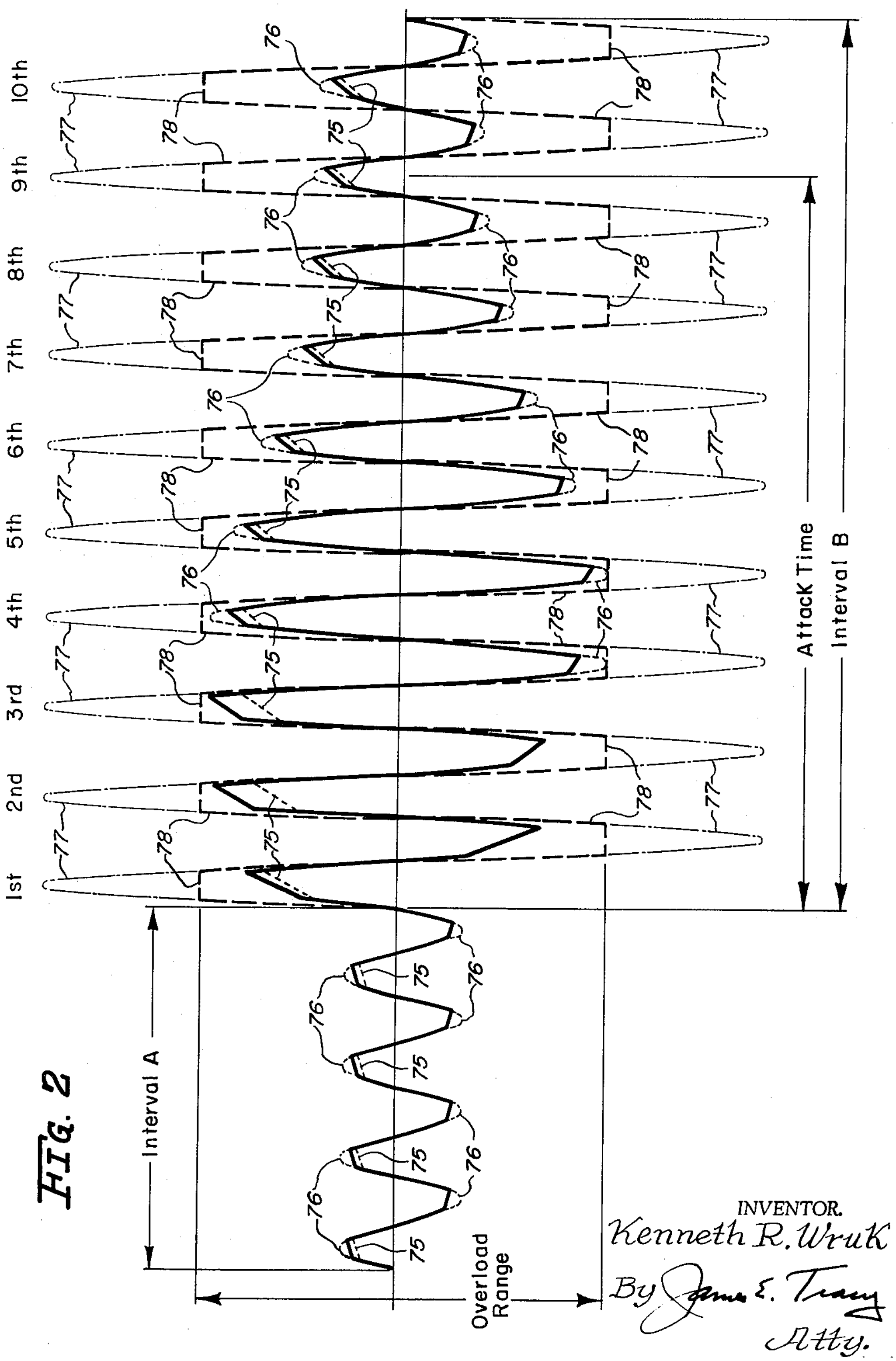

The features of this invention which are believed to be new are set forth with particularity in the appended claims. The invention, together with further objects and advantages thereof, may best be understood, however, by reference to the following description in conjunction with the accompanying drawings, in which:

FIGURE 1 illustrates a hearing aid including an automatic gain control arrangement constructed in accordance with one embodiment of the invention; and, FIGURE 2 illustrates a family of wave forms helpful in understanding the operation of the invention, and in demostrating advantages achieved over prior hearing aid circuits.

Turning now to FIGURE 1, the hearing aid there represented is of the type which operates from a battery power supply of not over one and one-half volts. It is a transistorized instrument of miniature form, being constructed for example within a temple bar of an eyeglass frame or being assembled in a tiny structure to be supported behind or even within the ear of the wearer. Since the physical structure of the aid, as distinguished from its circuitry, may be entirely conventional, it has not been illustrated. The aid comprises a magnetic microphone, schematically shown merely as a coil 10, having one terminal connected to the base 11 of a conventional PNP type junction transistor 12 and another terminal coupled through a condenser 14 to a plane of reference potential or ground. The emitter 15 of transistor 12 is also connected to ground and the collector 16 of the transistor is connected through a collector load resistance 18 and a decoupling resistor 19, connected in series, to the negative terminal of a source of unidirectional operating potential, shown as a battery 20, the positive terminal of which is connected to ground. The junction of resistors 18 and 19 is coupled to ground through a decoupling condenser 21. In this way, resistor 19 and condenser 21 decouple supply voltage source 20, with respect to the alternating audio components, from the transistor amplifying system. Collector 16 of transistor 12 is also coupled through a biasing resistor 23 to the junction of microphone 10 and condenser 14.

Collector 16 is additionally coupled through a D.C. blocking condenser 25 to the base 26 of another conventional PNP type junction transistor 28, the emitter 29 of which is coupled to ground. A resistor 31 is connected between collector 32 and base 26 of transistor 28 for biasing purposes. Collector 32 is connected through a collector load resistor 34 to the junction of resistor 19 and condenser 21, and is also coupled through a D.C. blocking condenser 37 to the base 38 of a conventional PNP type junction transistor 40, having an emitter 41 connected to ground. The collector 42 of transistor 40 is connected through a biasing resistor 43 to base 38 and is also connected through primary winding 45 of an output transformer 46 to the negative terminal of battery voltage source 20. A center-tapped secondary winding 47 of the transformer is coupled to the input of a conventional transistorized push-pull power amplifier 49, the output of which drives an output transducer in the form of an earphone transducer 50. Of course, the output transducer may take a variety of different forms; for example, it may constitute a conventional bone conduction receiver.

As thus far described, the hearing aid amplifying system of FIGURE 1 is conventional, having a relative low output impedance and comprising three cascade-connected transistorized amplifying stages each of which has an input impedance, namely the impedance of its base-emitter conduction path, which is relatively low. The AGC arrangement of the present invention includes a voltage step-up secondary winding 53 of transformer 46, one terminal of which is grounded while the other terminal is connected through a resistor 54 to the input terminal of a conventional voltage doubler 55. Specifically, voltage doubler 55 includes a condenser 57 and a diode 58 connected in series, and in the order named, between resistor 54 and ground, the diode being positioned polarity-wise such that its cathode element is connected to ground. The junction 59 of condenser 57 and the anode of diode 58, is connected to ground through a diode 60 in series with a condenser 61 in the order named. Diode 60 is arranged such that its cathode is connected to junction 59. Junction 63, between condenser 61 and diode 60, constitutes the output of the voltage doubler and is connected through a pair of series-connected resistors 65 and 66 to base 26 of transistor 28, and also through a pair of series-connected resistors 68 and 69 to the junction of magnetic microphone 10 and condenser 14. A condenser 71 couples the junction of resistors 65 and 66 to ground, and a condenser 72 couples the junction of resistors 68 and 69 to ground.

In operation of the hearing aid of FIGURE 1, battery 20 along with the circuit components associated with the three transistor amplifying stages 12, 28 and 40 serve to bias all three of those cascade-connected stages to a class A operating mode. In other words, the base of each transistor is established at a negative direct voltage with respect to its associated emitter so that all of the base-emitter junctions or conduction paths are forward biased, the base-collector junctions being reversed or back-biased. In this way, magnetic microphone 10 responds to received acoustic energy to produce an audio-frequency electrical signal, representative of the acoustic energy, for application between base 11 and emitter 15 of transistor 12. The signal is amplified in that transistor in normal fashion, the amplified replica being successively amplified in stages 28 and 40 in well known manner to produce in primary winding 45 of transformer 46 an amplified audio signal which in turn is further amplified in power amplifier 49 to develop a signal suitable for driving earphone output transducer 50. Ignoring the AGC circuit, an increase in loudness of the acoustic energy picked up by microphone 10 results in an amplified audio signal in each of the amplifying stages of increased peak-to-peak amplitude. Conversely, a decrease in loudness of the sound picked up manifests in an amplified audio signal of decreased peak-to-peak amplitude.

Secondary winding 53 has a step-up turns ratio with respect to primary 45 so that a voltage stepped-up replica of the amplified audio signal developed by stage 40 appears across the secondary. The audio voltage contains both the positive and negative peaks of the amplified audio and is applied to voltage doubler 55 which develops in well known fashion a unidirectional voltage at junctions 63 of negative polarity and having a magnitude double that of the peak amplitude.

Briefly, during the half cycles of audio when the ungrounded terminal of secondary winding 53 is positive, only diode 58 conducts and condenser 57 charges to the peak amplitude, junction 59 thereby being established at that peak amplitude except with a negative polarity with respect to ground. In response to the alternate half cycles when the ungrounded terminal of winding 53 becomes negative, diode 58 cuts off and the negative peaks charge condenser 61 through diode 60. Due to the fact that junction 59 is established at a negative voltage level and of a magnitude equal to the peak amplitude, condenser 61 effectively charges to the negative peak amplitude of the audio appearing on winding 53 plus the negative level of junction 59. The net result is that twice the peak voltage appears at junction 63 with respect to ground and this negative AGC voltage is applied through resistors 68 and 69 to base 11 of transistor 12 and through resistors 65 and 66 to base 26 of transistor 28. Of course, the greater the peak-to-peak amplitude of the audio signal developed in primary winding 45, the greater will be the magnitude, in a negative direction, of the automatic gain control voltage applied to bases 11 and 26.

As shown, the circuit employs "forward" AGC. To explain, gain is reduced by increasing the magnitude, in a forward biased direction, of the voltage applied to each base. Since transistors 12 and 28 are of the PNP variety, an increased negative voltage from voltage doubler 55 results in increased emitter-collector current in those transistors. Since the input impedance of a junction type transistor is a function of its equivalent emitter resistance, which in turn is a function of the emitter current, increasing the emitter-collector current results in a decreased input impedance, giving rise to a decrease in gain of the transistor.

Hence, voltage doubler 55 responds to both the positive and negative peaks of the amplified audio signal to develop an AGC voltage of negative polarity and of a magnitude determined by the loudness of the incoming received acoustic energy; this automatic gain control voltage is utilized for regulating the gain of the amplifying system, decreasing the gain in response to an increase in loudness of the received sound and increasing the gain when the loudness decreases.

As mentioned previously, to avoid distortion it is desirable that the gain of the amplifying system be not decreased instantaneously in response to an increase in loudness of the received acoustic energy, and yet it is also desirable that the gain decrease be completed within a predetermined time duration. In other words, the attack time for the decrease in gain must be of a predetermined duration and this is achieved in accordance with the present invention by the resistive-capacitive network including condensers 57, 61, 72, 14 and 71, and resistors 54, 68, 69 and 65. Since the AGC voltage increases in magnitude, with negative polarity, when the gain of the amplifying system is decreased during the attack time, the condensers in the resistive-capacitive network must charge up during that time. The resistive and capacitive components of this network are selected so that they exhibit a charging time constant which provides the desired attack time. It has been discovered that an optimum attack time lies in the range between 50 and 100 milliseconds. Condensers 57 and 61 charge through diodes 58 and 60, secondary winding 53, and resistor 54. Condenser 71 charges by way of diodes 58 and 60 and resistor 65. Condenser 72 charges via diodes 58 and 60 and resistor 68. Condenser 14 charges through diodes 58 and 60, and resistors 68 and 69. By proper selection of all of these resistive and capacitive elements, an optimum attack time constant somewhere in the range of 50 to 100 milliseconds may be attained.

As also mentioned previously, it is desired that an increase in gain in the amplifying system in response to a decrease in loudness of the received acoustic energy not occur instantaneously; it must not, however, be delayed too long. The recovery time should be of a certain duration within minimum and maximum limits. The desired recovery time is achieved in the present application by a resistive-capacitive network which includes all the above enumerated resistive and capacitive components making up the network which controls the attack time constant plus resistor 66. By this novel arrangement, the two networks employ several resistive and capacitive components in common and yet entirely different time constants are realized. It has been discovered that an optimum recovery time lies in the range between 100 and 200 milliseconds and the resistive and capacitive components controlling the recovery time exhibit a time constant falling in that range. Since most of the components of the two networks serve a dual capacity, a hearing aid circuit is obtained with the present invention which is not only economical in construction but requires a minimum of space which, of course, is at a premium in present-day miniaturized hearing aids.

Since the gain of the amplifying system is increased during the recovery time in response to a decrease in loudness of the received acoustic energy, the AGC voltage must decrease during that time. Hence, at least a portion of the charge on the condensers in the recovery time constant network must be removed. Specifically, during the recovery time, condenser 71 discharges through resistor 66 and the base-emitter junction of transistor 28. Condenser 72 discharges by way of resistor 69, magnetic microphone 10, and the base-emitter junction of transistor 12. Condenser 14 discharges through microphone 10 and the base-emitter junction of transistor 12. Condenser 61 discharges via one path containing resistors 65 and 66 and the base-emitter junction of transistor 28, and also through another path including resistors 68 and 69, microphone 10 and the base-emitter junction of transistor 12. Condenser 57 discharges through one path containing resistor 54 and winding 53, and also through another path containing diode 60 and the same paths through which condenser 61 discharges. The circuit parameters for the recovery time constant network are selected so that an optimum recovery time obtains.

As mentioned previously, secondary winding 53 of transformer 46 develops a voltage stepped-up replica of the amplified audio signal applied to primary winding 45. By then doubling the peak amplitude of the signal developed in secondary 53 a unidirectional AGC voltage of a magnitude considerably greater than that of the audio voltage developed in the primary is produced for automatic gain control. Of course, the AGC voltage may be increased further by employing a still higher turns ratio in transformer 46 so that a greater voltage step-up is achieved. However, such an expedient requires a significant increase in the physical space occupied by the output transformer in a present-day miniaturized transistorized hearing aid where the entire hearing aid is contained in a relatively small housing, such as is incorporated in a pair of spectacle frames. It has been found by employing a turns ratio of 2:1, along with the voltage doubler feature, an automatic gain control of sufficient magnitude is provided with a minimum space requirement.

In order to fully appreciate the advantages gained by the use of voltage doubler 55 in the AGC circuit, which feature is described and claimed in copending application Serial No. 198,226, filed concurrently herewith in the name of Walter S. Druz, and issued June 15, 1965, as Patent 3,189,841, attention is directed to the signal wave forms shown in FIGURE 2 which are representative of signals driving an output transducer under various conditions. During interval A in FIGURE 2, a relatively small sinusoidal signal, representative of received relatively low magnitude acoustic energy, is depicted. The waveform component shown in full-line construction is developed at the output of transistor 40 for application through amplifier 49 to output transducer 50. It will be noted that relatively small portions of both the positive and negative peaks are "sliced" or "bit" off inasmuch as the energy represented by those portions is required to drive the voltage doubler and the automatic gain control circuit. However, since the voltage doubler responds to both positive and negative peaks of the amplified audio, the amount "sliced" off those peaks is confined to a relatively insignificant amount, and because both the positive and negative peaks are treated alike, distortion attributable to asymmetry is avoided. In prior hearing aid amplifying systems employing automatic gain or volume control circuits of the single-ended or single-rectification type, amplitude peaks of only one polarity, for example positive, were utilized to develop the AGC voltage. Since the energy required for driving the AGC system was taken from only the positive half cycles of audio, the "bites" or "slices" had to be at least twice as much as necessitated by the voltage doubler arrangement of the present application. This is illustrated in interval A by dotted waveform portions 75. Of course, the deviation of dotted lines 75 from a true sinusoidal wave, as shown by dotted lines 76, results in noticeable distortion in the signal applied to the output transducer. Moreover, since the "bites" are taken from only the positive peaks, the distortion introduced is of the non-symmetrical variety which is even more noticeable and annoying to the wearer of the hearing aid.

The hearing aid without any AGC would, of course, receive at the input of its output transducer a sinusoidal signal. However, with the voltage doubling arrangement it has been found that the deviations from a true sinusoidal waveshape for a signal of the magnitude shown in interval A do not manifest in any appreciable distortion or decrease in intelligibility.

During interval B of FIGURE 2, the waveforms represent the action for various conditions to be described when the incoming acoustic energy increases substantially in magnitude from that during interval A. Again, during interval B the waveform component shown in full-line construction is produced for application to the output transducer by the circuit shown in FIGURE 1. The sinusoidal signal 77 shown in dash-dot construction, ten cycles labeled 1st–10th of which are shown, illustrates that which would be produced by a hearing aid without automatic gain control, and having a capability of amplifying without distortion or clipping. Of course, even if a hearing aid did have such a capability, the amplitude of the output signal would be so great that the wearer of the hearing aid would suffer considerable discomfort because of the loudness or "banging" of the sound delivered by the output transducer.

As a practical matter, most hearing aids without AGC would have an overload range as shown in FIGURE 2; as a consequence, a considerable part of each positive and negative half cycle would be clipped due to overdriving the amplifying stages between saturation and cut-off. Hence, the clipped signal 78 shown in dashed construction would be applied to an output transducer during interval B in a hearing aid without AGC. The distortion introduced by the clipping is rather substantial, leading not only to discomfort to the wearer but resulting in markedly decreased intelligibility.

The AGC circuit of the present application, however, handles the increase in sound intensity from interval A to interval B in meritorious fashion. During the initial or 1st cycle of the sinusoidal signal at the start of interval B, the automatic gain control circuit represents a rather substantial load on the amplifying system since the condensers included in the network which controls the attack time must charge up to the new voltage level which will prevail for the loudness intensity of the sound during interval B. Thus, considerable portions of the positive and negative peaks of the 1st cycle in interval B are "sliced" off because of the loading. Such loading prevents overdriving of the amplifying system, which would lead to clipping, during the attack time of the AGC system. Since the AGC circuit serves as a substantial load during the beginning of the attack time, there is no opportunity for the amplifying system to be overdriven during the period that the AGC circuit begins to charge up to the new gain control voltage and before the gain is reduced to a point within the overload range.

In the 2nd and 3rd cycles of sinusoidal signal during interval B, the "slices" taken off by the AGC circuit are progressively smaller since during that time the condensers provide a decreasing load. By the time the sinusoidal signal is into the second half of the 3rd cycle, the condensers in the gain control circuit have become charged to the extent that the automatic gain control action begins to occur or take hold, namely the gain of each of transistor stages 12 and 28 begins to decrease. From the 4th to the 9th cycles of the sinusoidal signal during interval B, the AGC circuit continues to function, and the condensers continue to charge, in response to the loudness of the acoustic energy in order that the gain of the amplifying system is decreased to an extent that the amplified audio signal developed for application to the output transducer, after the condensers in the AGC circuit have become fully charged to the new control voltage, is well within the overload range of the system and only slightly greater in amplitude than the signal applied to the output transducer during interval A in response to a signal of considerably less magnitude. From the 9th cycle on, assuming no decrease in loudness of the incoming acoustic energy, the signal applied to the output transducer would be similar to that shown during the 9th and 10th cycles. Since the AGC circuit does not charge up completely to the new control voltage in response to increased loudness until the 9th cycle, the time duration represented from the start of interval B to the 9th cycle illustrates the attack time. For a signal of different frequency than that shown in FIGURE 2 the attack time would require more or less than nine cycles, depending on whether the frequency increases or decreases.

Again, dotted lines 75 indicate the amount of signal that would be "sliced" during interval B with previously developed single-rectification AGC circuits. Such previous arrangements introduce greater distortion because of asymmetry. The waveshape of the signal applied to the output transducer during the negative half cycles of the 1st through 4th cycles, in a hearing aid with a single-ended AGC circuit, is also represented by the clipped signal 78 shown in dashed construction. Clipping occurs, of course, because AGC action has not yet taken hold and because loading of the single-rectification AGC system prevails only during the positive peaks.

The deviations from a true sinusoidal shape, as outlined by dotted lines 76, by the full-line waveform achieved by the AGC circuit of the present application are not significant enough to be manifest as noticeable distortion in the signal delivered to the output transducer. Hence, automatic gain control is achieved with a minimum of symmetrical distortion, especially when compared with AGC arrangements utilized in previous hearing aids.

The circuit of FIGURE 1 has been constructed and successfully operated by utilizing the following circuit parameters:

| | | |
|---|---|---|
| Microphone **10** | | [1] |
| Transistors **12, 28, 40** | | CK891, CK891, CK892 |
| Resistor **23** | ohms | 22K |
| Condenser **14** | mfd | .1 |
| Resistor **18** | ohms | 1500 |
| Resistor **69** | do | 3900 |
| Condenser **72** | mfd | 4 |
| Resistor **68** | ohms | 3900 |
| Condenser **25** | mfd | 4 |
| Resistor **66** | ohms | 3900 |
| Condenser **71** | mfd | 10 |
| Resistor **65** | ohms | 3900 |
| Resistor **31** | do | 27K |
| Resistor **34** | do | 1500 |
| Condenser **37** | mfd | 1 |
| Resistor **43** | ohms | 39K |
| Resistor **19** | do | 270 |
| Condenser **21** | mfd | 40 |
| Battery **20** | volt mercury | 1.3 |
| Voltage step-up ratio between windings **45** and **53** | | 2:1 |
| Resistor **54** | ohms | 2200 |
| Condenser **57** | mfd | 4 |
| Diodes **58** and **60** | | HT Z1 49 |
| Condenser **61** | mfd | 10 |

[1] $R$=850 ohms $X_L$=3500 ohms @ 1 kc.

The present invention therefore provides a novel arrangement of resistors and capacitors which provide attack and recovery time constants of different duration, many of the resistors and capacitors being instrumental in determining both of the time constants. By this arrangement, a minimum of circuit components are required leading not only to a minimum space requirement but also to economy in manufacturing.

While particular embodiments of the invention have been shown and described, modifications may be made, and it is intended in the appended claims to cover all such modifications as may fall within the true spirit and scope of the invention.

I claim:

1. A hearing aid comprising:

a transistorized amplifying system having a relatively low output impedance for developing, in response to received acoustic energy of varying loudness, an amplified audio signal representative of said acoustic energy and including at least one transistor having a collector, a base and an emitter and having a base-emitter conduction path of relatively low impedance;

voltage developing means coupled to the output of said transistorized amplifying system and consisting only of passive circuit components for developing from said amplified audio signal an automatic gain control voltage having a magnitude determined by the instantaneous loudness of said incoming received acoustic energy;

means for applying said automatic gain control voltage as a variable bias to said base-emitter conduction path of said transistor to vary the input impedance thereof thereby to vary the gain of said amplifying system in a direction tending to maintain the output of said system at a constant amplitude in spite of variations in loudness of said received acoustic energy;

a first resistive-capacitive network at least partially included in said voltage developing means, and including a plurality of resistive and capacitive components, for establishing an attack time of predetermined duration;

and a second resistive-capacitive network at least partially included in said voltage developing means, including resistive and capacitive components in common with said first network and also including said base-emitter conduction path of said transistor, for establishing a recovery time of a certain duration, exceeding said predetermined duration of said attack time.

2. A hearing aid comprising:

a transistorized amplifying system having a relatively low output impedance for developing, in response to received acoustic energy of varying loudness, an amplified audio signal representative of said acoustic energy and including at least one transistor having a collector, a base and an emitter and having a base-emitter conduction path of relatively low impedance;

voltage developing means coupled to the output of said transistorized amplifying system and consisting only of passive circuit components for developing from said amplified audio signal an automatic gain control voltage having a magnitude determined by the instantaneous loudness of said incoming received acoustic energy;

means for applying said automatic gain control voltage as a variable bias to said base-emitter conduction path of said transistor to vary the input impedance thereof thereby to vary the gain of said amplifying system in a direction tending to maintain the output of said system at a constant amplitude in spite of variations in loudness of said received acoustic energy;

a first resistive-capacitive network at least partially included in said voltage developing means, including a plurality of resistive and capacitive components, for establishing an attack time in the range between 50 and 100 milliseconds;

and a second resistive-capacitive network at least partially included in said voltage developing means, including resistive and capacitive components in common with said first network and also including said base-emitter conduction path of said transistor, for establishing a recovery time in the range between 100 and 200 milliseconds.

3. A hearing aid comprising:

a transistorized amplifying system having a relatively low output impedance for developing, in response to received acoustic energy of varying loudness, an amplified audio signal representative of said acoustic energy and including at least one transistor having a collector, a base and an emitter and having a base-emitter conduction path of relatively low impedance;

storage condenser means;

charging circuitry, coupled to the output of said transistorized amplifying system and consisting only of passive circuit components, for charging said storage condenser means in response to an increase in loudness of said incoming received acoustic energy to develop in said storage condenser means an automatic gain control voltage having a magnitude determined by the instantaneous loudness of said received acoustic energy, said charging circuitry and storage condenser means collectively establishing a predetermined attack time constant;

means for applying said automatic gain control voltage as a variable bias to said base-emitter conduction path of said transistor to vary the input impedance thereof thereby to vary the gain of said amplifying system in a direction tending to maintain the output of said system at a constant amplitude in spite of variations in loudness of said received acoustic energy;

and means for discharging said storage condenser means only through said base-emitter conduction path of said transistor in response to a decrease in loudness of said received acoustic energy to decrease the magnitude of said automatic gain control voltage, said discharging means and storage condenser means collectively establishing a recovery time constant longer than said attack time constant.

References Cited by the Examiner

UNITED STATES PATENTS

| | | | |
|---|---|---|---|
| 2,222,759 | 11/1940 | Burnside | 325—410 |
| 2,288,434 | 6/1942 | Bradley | 330—141 X |
| 2,462,452 | 2/1949 | Yates | 330—138 X |
| 3,021,489 | 2/1962 | Nielsen | 330—29 |
| 3,109,989 | 11/1963 | Muir | 330—141 X |

ROY LAKE, *Primary Examiner.*

NATHAN KAUFMAN, *Examiner.*